Patented Jan. 4, 1938

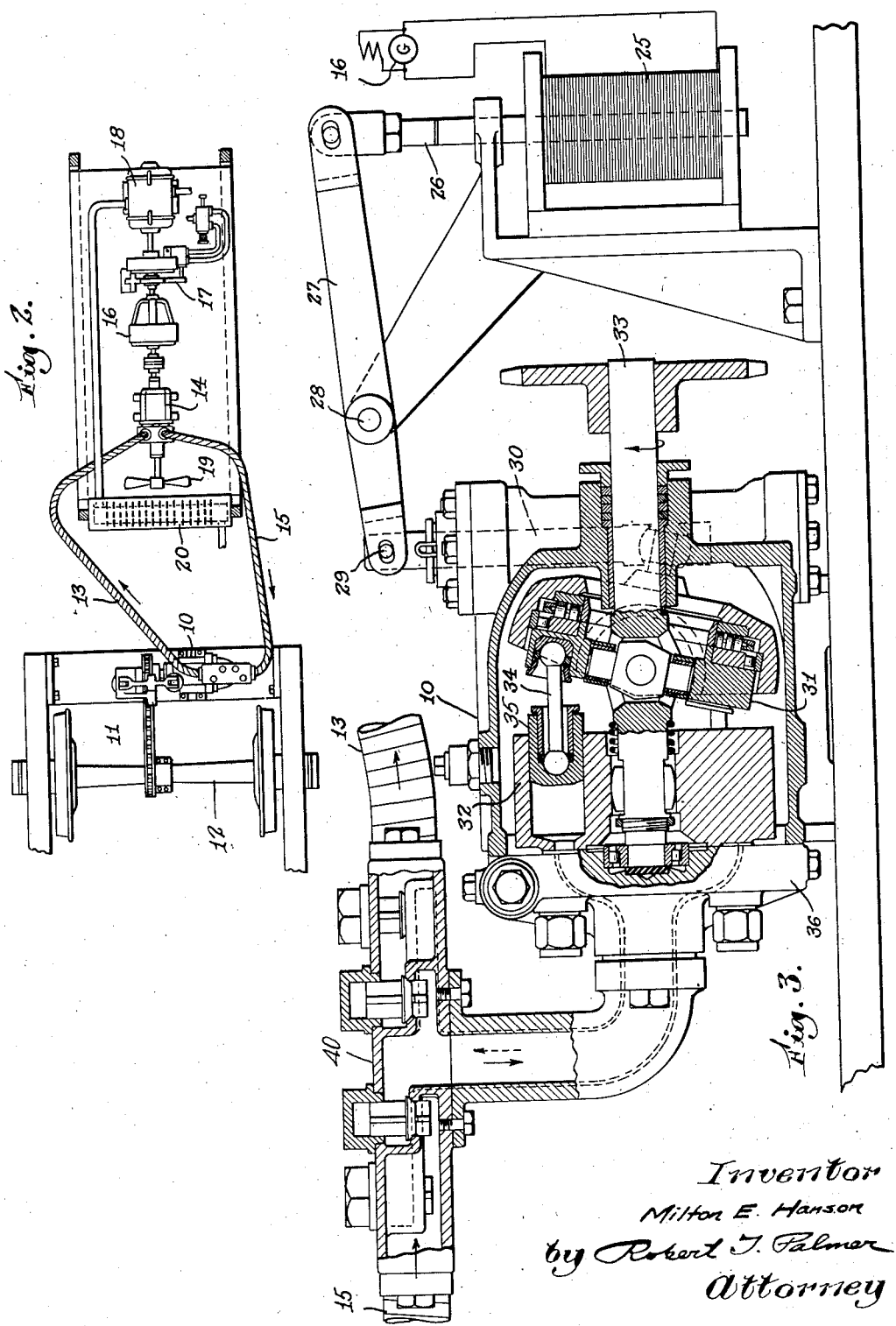

2,104,696

UNITED STATES PATENT OFFICE 2,104,696

REFRIGERATION DRIVE

Milton E. Hanson, Collingswood, N. J., assignor to B. F. Sturtevant Company, Inc., Hyde Park, Boston, Mass.

Application February 26, 1935, Serial No. 8,261

7 Claims. (Cl. 62—117)

This invention relates to refrigeration equipment, and relates more particularly to apparatus for operating refrigeration and air conditioning equipment through energy derived from the movement of railway cars.

There are at present two types of mechanical refrigeration systems for supplying the necessary refrigeration effect to the air conditioning equipment in railway passenger cars. The most commonly used is the electro-mechanical system utilizing an electric generator driven from the car axle to provide the necessary power for operating a refrigerant compressor through the intermediary of an electric motor, and for also supplying electrical energy to the electric motors driving the fans and any other moving equipment. Since the cars move at varying speeds, the problem of generator output control has been serious, and no real satisfactory method of maintaining constant generator output, regardless of car speed, has been devised where the generator is driven directly from the car axle.

In the other system now used in mechanical refrigeration on railway passenger cars, a compressor is driven directly from the car axle, a magnetic clutch being used to drive the compressor at a constant speed. This arrangement, however, requires, in addition, a generator and battery, and has not been found entirely satisfactory.

According to this invention, a hydraulic drive is used for operating the refrigerant compressor and electric generator. A hydraulic pump is connected to the car axle, and this pump drives a hydraulic motor to which is connected an electric generator and a compressor, the compressor being adapted to be disconnected from the hydraulic motor when refrigeration is not required. The generator, which is constantly connected to the hydraulic motor, supplies electrical energy for car lighting, for the air conditioning apparatus, and for any other electrical equipment which may be present. The stroke of the hydraulic pump varies with car speeds, with the result that a constant output is delivered to the hydraulic motor, regardless of car speeds.

In one embodiment of the invention, two hydraulic motors are driven in series relationship from the hydraulic pump. One motor drives the refrigerant compressor; the second motor drives an electric generator, which charges a storage battery. A by-pass valve is connected across the hydraulic pump, and, when closed, as when the car is standing, the battery is used to drive the electric generator as a motor, which, in turn, drives its associated hydraulic motor as a hydraulic pump. The hydraulic fluid then passes through the motor to the refrigerant compressor and drives the compressor. This enables the refrigeration apparatus to be used for precooling purposes, as during a period preliminary to the time the car is placed in service, or for cooling the car on a run, as when standing in a station or on a siding for any substantial period of time.

An object of the invention is to operate refrigeration equipment on a railway car with a hydraulic drive from a car axle.

Another object of the invention is to control, automatically, the output of a hydraulic pump driven by a car axle, to supply a constant output to an associated hydraulic motor, regardless of car speed.

Other objects of the invention will be apparent from the following description, taken together with the drawings.

The invention will now be described with reference to the drawings, of which:

Fig. 2 is a plan view, looking downwardly on the hydraulic apparatus of Fig. 1;

Fig. 3 is a view, partially in section, of a hydraulic pump and automatic means for varying the stroke of the pump, according to this invention.

Figure 1:
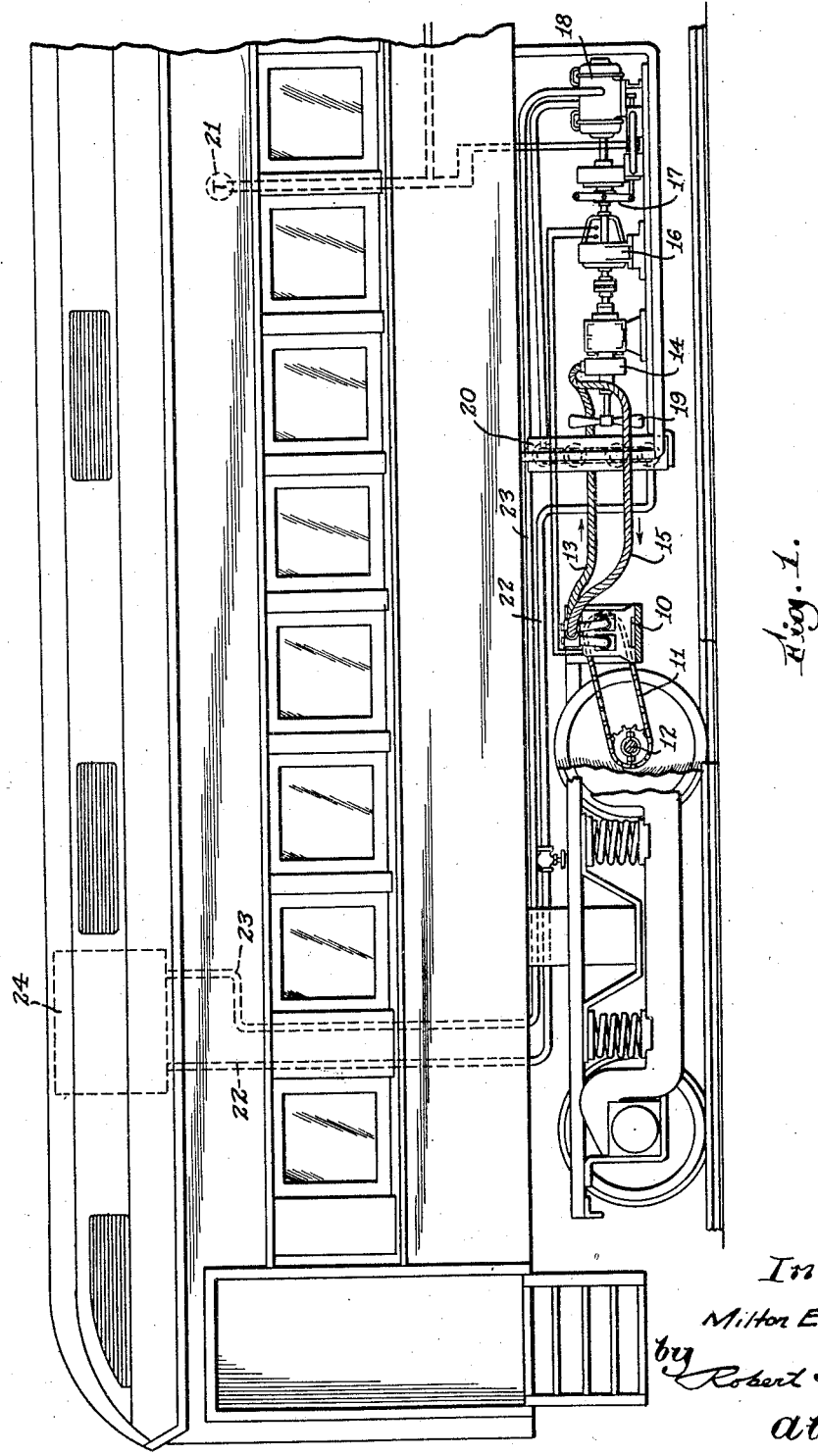
Fig. 1 is a side view, showing apparatus according to this invention mounted on the under side of a railway passenger car.

The hydraulic pump, according to this invention, some of the details of which are shown by Fig. 3, is indicated on Fig. 1 by the numeral 10, and is driven by means of the chain 11 from the axle 12 of the car. The pump 10 is constructed to force fluid in the same direction, regardless of the direction of rotation of the car axle; and the fluid pumped, which may be an ordinary hydraulic oil, travels through the flexible tubing 13 and into the fluid motor 14, which it rotates, the fluid returning to the pump 10 through the flexible tubing 15. The hydraulic motor 14 is connected directly to the electric generator 16 and is connected through the intermediary of the clutch 17 to the refrigerant compressor 18. The fan 19 is mounted on an extension of the shaft of the motor 14, and serves to force air over the condenser coils 20, associated with the compressor 18. The clutch 17 may be controlled by the thermostat 21, which is exposed to temperatures within the passenger space, to disconnect the compressor 18 when cooling is not required.

A refrigerant compressed in the compressor 18 and condensed in the coils 20 may be circulated through pipes 22 and 23 to the air conditioning compartment 24, mounted in the upper portion of the car, where it serves to cool the air passing therethrough.

The hydraulic pump 18 is preferably of the well known type manufactured by the Waterbury Tool Company, of Waterbury, Conn., and almost universally used by the United States Navy for control of gun elevating, turret turning, hoist, steering gears, and windlasses. This type of pump is described in Catalog No. 16, published by the Waterbury Tool Company, and, since the details of this pump are not a part of the present invention, only sufficient of the structure will be described in connection with Fig. 3 as is necessary for an understanding of the automatic control for varying the throw of the pistons in proportion to the car speed.

The voltage developed in the generator 16 is proportional to the speed of rotation. Accordingly, the solenoid 25 is connected across the output of the generator 16 and the magnetic flux developed in this solenoid is proportional to the output of the generator, and, of course, to its speed of rotation. The plunger 26 of the solenoid is arranged to move into the solenoid a distance proportional to the magnetic force exerted, which, in turn, is proportional to the output of the generator 16. The plunger 26 moves the lever 27, which is pivoted at 28, and the other end of which is connected at 29 to a control lever 30. The control lever 30 serves to tilt a socket ring 31 away from the cylinder barrel 32.

When the socket ring 31 is in neutral position, that is, perpendicular to the driving shaft 33, rotation of the shaft 33 will carry around with it the socket ring 31, cylinder barrel 32, connecting rods 34, and pistons 35; the pistons will not reciprocate, and there will be no pumping of oil. When, however, the cylinder barrel is moved away from its neutral position, as illustrated by Fig. 3, all of the pistons, as they move down on the far side of the machine, will force oil through the port on the far side. Likewise, all the pistons, as they move up on the near side, will slide away from the valve plate 36 and suck oil through the port in the near side of the valve plate. The far port will thus be under pressure, while the near port is under suction.

The amount of oil pumped is, therefore, in proportion to the angle of the cylinder barrel 31 from neutral position. As the speed of the generator 16 increases, the plunger 26 is drawn further into the solenoid 25, the cylinder barrel 31 is placed nearer to its neutral position, and the stroke of the pistons is decreased. As the speed of the generator 16 decreases, the plunger 26 withdraws from the solenoid and the lever 30 serves to increase the stroke of the pistons of the pump.

The apparatus of the system is so designed that, except at very low train speeds, the hydraulic motor will be operated at a constant speed, due to the output of the hydraulic pump varying with varying car speeds, and will drive the generator and compressor at substantially a constant speed. The generator will deliver a constant voltage and output at car speeds very much lower than can be done with the present axle-driven generator system, with the result that the generator and compressor can be directly operated without use of the car battery a greater portion of the time, and the car battery will be in service but a fraction of the time previously required.

The hydraulic pump 18 may have its output connected with the automatic reversing device 40 for maintaining the flow of fluid from the pump to the motor in the same direction, regardless of direction of movement of the car. The reversing device 40, illustrated, is described in Patent No. 1,307,602, issued June 24, 1919, to J. O. Schirmer. Obviously, other well known types of reversing devices could be utilized.

Figure 4:
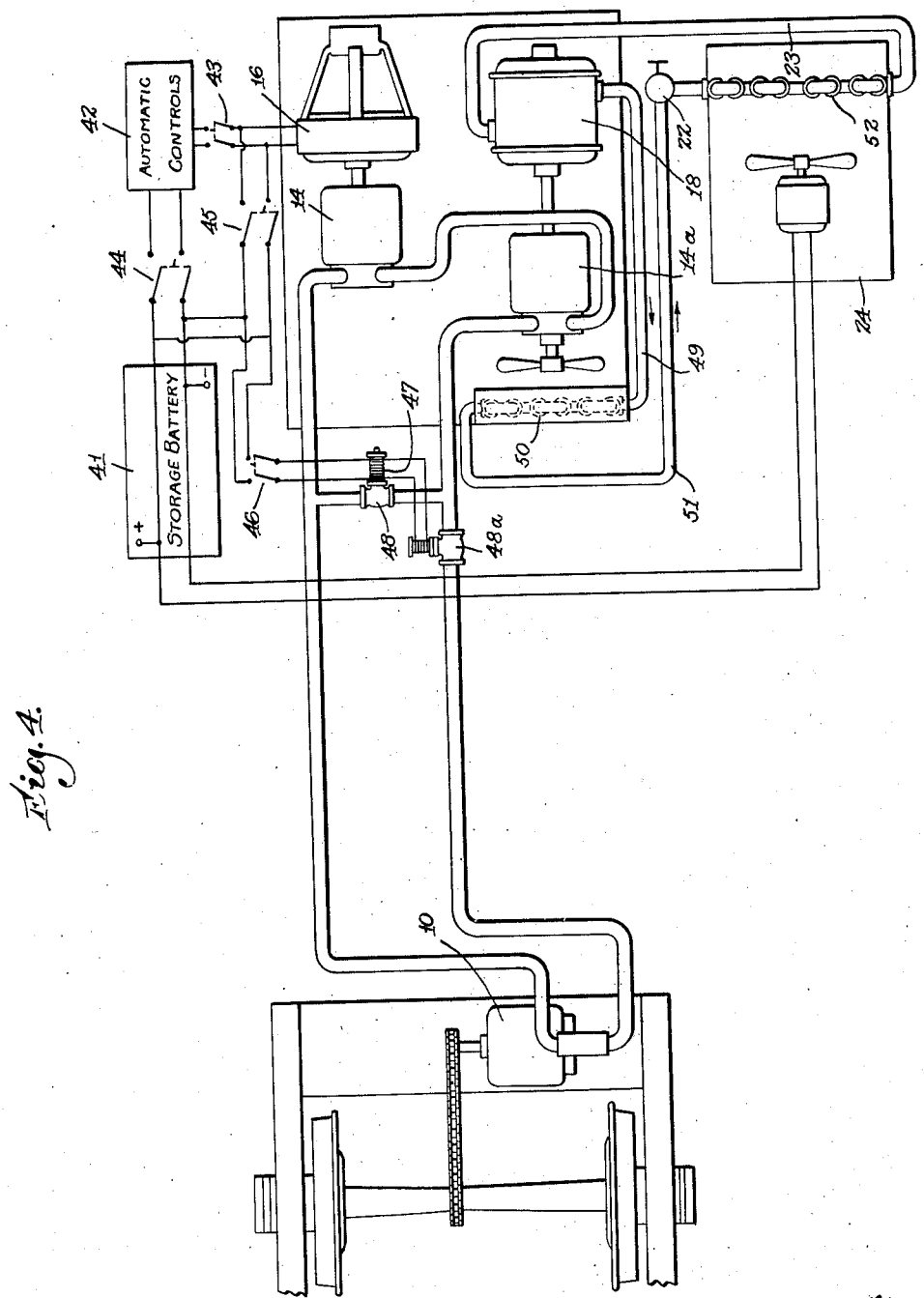
Fig. 4 is a more or less diagrammatic view, showing a hydraulic pump driving two hydraulic motors in series, the pump being adapted to be cut out of service and one of the motors being adapted to be driven as a pump to energize the other motor.

In the embodiment illustrated by Fig. 4, the generator 16 is driven by the motor 14, while the compressor 18 is driven by the motor 14a, connected in series relationship with the motor 14, the one pump 18 serving to rotate both motors. The generator 16 serves to charge the storage battery 41, the automatic controls 42 being interposed in the circuit between the battery and the generator. These automatic controls are disclosed on page 1840 of the 1922 edition of "Standard Handbook for Electrical Engineers", published by the McGraw-Hill Book Company.

In order that the refrigerant compressor 18 may be operated when the railway car is at a standstill, provision is made for driving the generator 16 as an electric motor through energy derived from the storage battery 41, in which event the motor 14 will operate as a hydraulic pump to rotate the motor 14a, which, in turn, drives the compressor 18. In order to accomplish this, the switch 43, connecting the generator to the automatic controls 42, is opened, the switch 44, connecting the storage battery to the automatic control, is opened, the switch 45, connecting the storage battery 41 to the generator 16, is closed, and the switch 46, connecting the solenoid 47 to the battery 41, is closed.

When the switch 46 is closed, the solenoid 47 is energized and opens the valve 48, which opens a by-pass fluid circuit around the generator 16, thus enabling the motor 14 to be driven as a pump to drive the motor 14a. The valve 48—A closes at the same time to prevent pressure in the line to the pump 18.

Obviously, the switches 43, 44, 45 and 46 could be manipulated by a single remotely operated control, which could be either of the thermostatically or manually operated type.

The motors 14 and 14a may have the same internal construction as the pump 18, the details of which are illustrated by Fig. 3, except that no provision need be made for varying the stroke of the pistons. Obviously, other well known types of hydraulic motors and pumps, such as the rotary type, could be used.

The automatic control for decreasing the output of the hydraulic pump proportional to increases in car speed has been illustrated as an electrical one, connected in the circuit of the generator driven by the hydraulic motor. It should be understood, however, that the output of the hydraulic pump could also be varied with the well known governor ball arrangement in which the balls are thrown outwardly by centrifugal force to operate mechanism to decrease the output of the pump in accordance with increases in car speeds. Furthermore, the pressure or rate of delivery on the output side of the hydraulic pump could be used to decrease the output of the pump in accordance with increases in car speeds.

Whereas several embodiments of the invention have been described for the purpose of illustration, it should be understood that the invention is not limited to the details described, since many modifications may be made by those skilled in the art without departing from the spirit of the invention.

What is claimed is:

1. Air conditioning apparatus for a railway passenger car, comprising an air conditioning compartment, air cooling means in said compartment, a fan for passing the air to be conditioned through said compartment and for discharging it into the passenger space, an electric motor for driving said fan, a refrigerant compressor for providing a cooling effect for said means, an electric generator for supplying current to said motor, hydraulic means for driving said compressor and generator, and a hydraulic pump driven through the movement of said car for energizing said hydraulic means.

2. Air conditioning apparatus for a railway passenger car, comprising an air conditioning compartment, air cooling means in said compartment, a fan for passing the air to be conditioned through said compartment and for discharging it into the passenger space, an electric motor for driving said fan, a refrigerant compressor for providing a cooling effect for said means, an electric generator for supplying current to said motor, a hydraulic motor for driving said compressor and generator, and a hydraulic pump driven through the movement of said car for energizing said hydraulic motor.

3. Air conditioning apparatus for a railway passenger car, comprising an air conditioning compartment, air cooling means in said compartment, a fan for passing the air to be conditioned through said compartment and for discharging it into the passenger space, an electric motor for driving said fan, a refrigerant compressor for providing a cooling effect for said means, an electric generator for supplying current to said motor, a hydraulic motor for driving said compressor, another hydraulic motor for driving said generator, and a hydraulic pump driven through the movement of said car for energizing said hydraulic motors.

4. Air conditioning apparatus for a railway passenger car, comprising an air conditioning compartment, air cooling means in said compartment, a fan for passing the air to be conditioned through said compartment and for discharging it into the passenger space, an electric motor for driving said fan, a refrigerant compressor for providing a cooling effect for said means, an electric generator for supplying current to said motor, hydraulic means for driving said compressor and generator, a hydraulic pump driven through the movement of said car for energizing said hydraulic means, and means for adjusting the output of said pump as variations in the speed of movement of said car take place.

5. Air conditioning apparatus for a railway passenger car, comprising an air conditioning compartment, air cooling means in said compartment, a fan for passing the air to be conditioned through said compartment and for discharging it into the passenger space, an electric motor for driving said fan, a refrigerant compressor for providing a cooling effect for said means, an electric generator for supplying current to said motor, a hydraulic motor for driving said compressor and generator, a hydraulic pump driven through the movement of said car for energizing said hydraulic motor, and means for disconnecting said compressor from said hydraulic motor.

6. Air conditioning apparatus for a railway passenger car, comprising an air conditioning compartment, air cooling means in said compartment, a fan for passing the air to be conditioned through said compartment and for discharging it into the passenger space, an electric motor for driving said fan, a refrigerant compressor for providing a cooling effect for said means, an electric generator for supplying current to said motor, hydraulic means for driving said compressor and generator, a hydraulic pump driven through the movement of said car for energizing said hydraulic means, and means associated with said generator for adjusting the output of said pump as variations in the speed of movement of said car take place.

7. Air conditioning apparatus for a railway passenger car, comprising an air conditioning compartment, air cooling means in said compartment, a fan for passing the air to be conditioned through said compartment and for discharging it into the passenger space, an electric motor for driving said fan, a battery for energizing said motor, means energized through movement of the car for energizing said battery, a refrigerant compressor for providing a cooling effect for said air cooling means, hydraulic means for driving said compressor, a hydraulic pump driven through movement of said car for energizing said hydraulic means, and means for varying the output of said pump in accordance with variations in the speed of movement of said car.

MILTON E. HANSON.